United States Patent
Gontani et al.

(10) Patent No.: US 11,819,878 B2
(45) Date of Patent: Nov. 21, 2023

(54) METHOD FOR FORMING MULTILAYER COATING FILM

(71) Applicant: KANSAI PAINT CO., LTD., Hyogo (JP)

(72) Inventors: Haruyuki Gontani, Kanagawa (JP); Natsuko Nakano, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 363 days.

(21) Appl. No.: 17/163,702

(22) Filed: Feb. 1, 2021

(65) Prior Publication Data
US 2021/0237119 A1 Aug. 5, 2021

(30) Foreign Application Priority Data

Feb. 4, 2020 (JP) ................. 2020-016885
Dec. 25, 2020 (JP) ................. 2020-217953

(51) Int. Cl.
| | | |
|---|---|---|
| *B05D 7/00* | (2006.01) | |
| *B05D 7/14* | (2006.01) | |
| *C08K 3/04* | (2006.01) | |
| *C08K 3/22* | (2006.01) | |
| *C08K 3/34* | (2006.01) | |
| *C08K 3/40* | (2006.01) | |
| *C08K 9/02* | (2006.01) | |
| *C09D 5/33* | (2006.01) | |
| *C09D 5/36* | (2006.01) | |
| *G01S 17/931* | (2020.01) | |

(52) U.S. Cl.
CPC ............... *B05D 7/572* (2013.01); *B05D 7/14* (2013.01); *B05D 7/576* (2013.01); *C08K 3/04* (2013.01); *C08K 3/22* (2013.01); *C08K 3/34* (2013.01); *C08K 3/40* (2013.01); *C08K 9/02* (2013.01); *C09D 5/004* (2013.01); *C09D 5/36* (2013.01); *B05D 2202/00* (2013.01); *B05D 2420/00* (2013.01); *B05D 2420/02* (2013.01); *B05D 2601/06* (2013.01); *G01S 17/931* (2020.01)

(58) Field of Classification Search
CPC ................. B05D 7/572; B05D 7/14
See application file for complete search history.

(56) References Cited

U.S. PATENT DOCUMENTS

| | | |
|---|---|---|
| 2017/0001217 A1 | 1/2017 | Fujiwara |
| 2018/0231640 A1 | 8/2018 | Han et al. |
| 2020/0088916 A1 * | 3/2020 | Nagahama ................ B32B 7/02 |
| 2020/0398308 A1 | 12/2020 | Okazaki et al. |
| 2021/0178428 A1 | 7/2021 | Ono et al. |

FOREIGN PATENT DOCUMENTS

| | | |
|---|---|---|
| CN | 105899304 | 8/2016 |
| EP | 2 079 808 | 7/2009 |
| JP | 2014-42891 | 3/2014 |
| JP | 2018-132524 | 8/2018 |
| WO | 2019/088201 | 5/2019 |
| WO | 2019/142639 | 7/2019 |
| WO | WO-2019142639 A1 * | 7/2019 ............... B05D 1/36 |

OTHER PUBLICATIONS

Office Action dated Jun. 2, 2022 in corresponding Chinese Patent Application No. 202110140480.1, with English language translation.
Extended European Search Report dated Jul. 7, 2021 in European Patent Application No. 21155187.4.

* cited by examiner

*Primary Examiner* — Dah-Wei D. Yuan
*Assistant Examiner* — Kristen A Dagenais
(74) *Attorney, Agent, or Firm* — Wenderoth, Lind & Ponack, L.L.P.

(57) ABSTRACT

Provided is a method for forming a multilayer coating film that is capable of forming a multilayer coating film that has pearly luster with excellent blackness and high reflectance of an infrared laser. The method for forming a multilayer coating film includes applying a carbon black pigment-containing first colored paint (X) to form a first colored coating film; applying a second colored paint (Y) containing a pigment (A) that is a transparent or translucent base material coated with a metal oxide to form a second colored coating film; applying a clear paint (Z) to form a clear coating film; and heating the first colored coating film, the second colored coating film, and the clear coating film separately or simultaneously to cure these films, wherein the first colored coating film has a lightness $L^*(45°)$ of less than 20, the multilayer coating film has a lightness $L^*(45°)$ of less than 20, and the multilayer coating film has a diffuse reflectance of 10% or more at a wavelength of 905 nm.

11 Claims, No Drawings

METHOD FOR FORMING MULTILAYER COATING FILM

TECHNICAL FIELD

The present invention relates to a method for forming a multilayer coating film.

BACKGROUND ART

Autonomous driving is attracting attention as a key technology of next-generation automobile technology. To enable autonomous driving, it is necessary to use various sensing technologies, one of which is LIDAR (Light Detection and Ranging). LIDAR can measure the distance to an object by irradiating it with an infrared laser, and detecting the reflected light returned from the object. Thus, LIDAR is useful as a high-precision sensor for detecting medium and long distances.

For example, PTL 1 discloses a light detection and ranging (LIDAR) device, comprising a light source to emit a light beam to scan a scope of orientations associated with a target scanning zone; a first microelectromechanical system (MEMS) mirror configured to receive and redirect the light beam towards to the target scanning zone, wherein the first MEMS mirror is configured to tilt in a plurality of directions with respect to the light source to redirect the light beam in a plurality of angles in the plurality of directions; and a light detector to receive the light beam reflected from one or more objects located within the target scanning zone, wherein the first MEMS mirror is arranged to tilt to redirect the light beam at a plurality of angles, and allows the light detector to receive the light beam reflected at a plurality of angles to obtain a multiple angular resolution of the one or more objects.

CITATION LIST

Patent Literature

PTL 1: JP2018-132524A

SUMMARY OF INVENTION

Technical Problem

LIDAR is sensing technique to measure the distance to an object by irradiating the object with an infrared laser, and detecting the reflected light returned from the object. Thus, the detection sensitivity of LIDAR significantly decreases with an object that does not particularly reflect an infrared laser (e.g., an object with a low lightness, such as one with a black color).

However, low-lightness coating colors such as black are popular as vehicle coating colors due to the sense of luxury attached to objects. Thus, there is demand for low-lightness coating colors that can reflect an infrared laser. In particular, low-lightness coating colors that appear differently depending on the viewing angle, such as pearlescent colors, are in great demand due to the effect of highlighting the contour of products.

Thus, an object of the present invention is to provide a method for forming a multilayer coating film that is capable of forming a multilayer coating film that has pearly luster with excellent blackness and high reflectance of an infrared laser.

Solution to Problem

The present invention includes the subject matter described in the following Items.

Item 1.

A method for forming a multilayer coating film, the method comprising step (1): applying a carbon black pigment-containing first colored paint (X) to form a first colored coating film, step (2): applying a second colored paint (Y) containing a pigment (A) that is a transparent or translucent base material coated with a metal oxide to the first colored coating film to form a second colored coating film, step (3): applying a clear paint (Z) to the second colored coating film to form a clear coating film, and step (4): heating the first colored coating film formed in step (1), the second colored coating film formed in step (2), and the clear coating film formed in step (3) separately or simultaneously to cure these films, wherein the first colored coating film has a lightness $L^*(45°)$ of less than 20, the multilayer coating film has a lightness $L^*(45°)$ of less than 20, and the multilayer coating film has a diffuse reflectance of 10% or more at a wavelength of 905 nm.

Item 2.

The method for forming a multilayer coating film according to Item 1, wherein the pigment (A) that is a transparent or translucent base material coated with a metal oxide contains a metal-oxide-coated mica pigment (A1) and/or a metal-oxide-coated glass flake pigment (A2).

Item 3.

The method for forming a multilayer coating film according to Item 2, wherein the pigment (A) that is a transparent or translucent base material coated with a metal oxide contains the metal-oxide-coated mica pigment (A1), and the metal-oxide-coated mica pigment (A1) has a hue angle h (15°) within the range of either 240° to 360° or 0° to 100° in an $L^*C^*h$ color space.

Item 4.

The method for forming a multilayer coating film according to Item 2 or 3, wherein the pigment (A) that is a transparent or translucent base material coated with a metal oxide contains the metal-oxide-coated mica pigment (A1), and the content of the metal-oxide-coated mica pigment (A1) is within the range of 5 to 20 parts by mass per 100 parts by mass of the resin solids of the second colored paint (Y).

Item 5.

The method for forming a multilayer coating film according to any one of Items 2 to 4, wherein the pigment (A) that is a transparent or translucent base material coated with a metal oxide contains the metal-oxide-coated glass flake pigment (A2), and the metal-oxide-coated glass flake pigment (A2) has a hue angle h (15°) within the range of either 240° to 360° or 0° to 100° in the $L^*C^*h$ color space.

Item 6.

The method for forming a multilayer coating film according to any one of Items 2 to 5, wherein the pigment (A) that is a transparent or translucent base material coated with a metal oxide contains the metal-oxide-coated glass flake pigment A2), and the content of the metal-oxide-coated glass flake pigment (A2) is within the range of 15 to 30 parts by mass per 100 parts by mass of the resin solids of the second colored paint (Y).

Item 7.

The method for forming a multilayer coating film according to any one of Items 1 to 6, wherein the second colored paint (Y) further contains a carbon black pigment (B).

Item 8.

The method for forming a multilayer coating film according to Item 7, wherein the ratio of the carbon black pigment (B) to the pigment (A) that is a transparent or translucent base material coated with a metal oxide is 0.15 or less on a mass basis.

Item 9.

The method for forming a multilayer coating film according to any one of Items 1 to 8, wherein the ratio of the diffuse reflectance at a wavelength of 905 nm to the average of diffuse reflectances at a wavelength of 400 to 700 nm of the multilayer coating film is 1.3 or more.

Advantageous Effects of Invention

The method for forming a multilayer coating film according to the present invention forms a multilayer coating film that has pearly luster with excellent blackness and high reflectance of an infrared laser.

DESCRIPTION OF EMBODIMENTS

Step (1)

The method for forming a multilayer coating film according to the present invention first applies a first colored paint (X) to form a first colored coating film in step (1). The first colored paint (X) provides hiding power and determines the lightness of the formed multilayer coating film, and contains a carbon black pigment.

The content of the carbon black pigment is preferably 1 to 30 parts by mass, and more preferably 2 to 10 parts by mass on a solids basis, per 100 parts by mass of the resin solids of the first colored paint (X) from the standpoint of, for example, obtaining a multilayer coating film excellent in undercoat hiding power and blackness.

The first colored coating film has a lightness $L^*(45°)$ of less than 20 in an $L^*C^*h$ color space.

The $L^*C^*h$ color space is a polar coordinates version of the $L^*a^*b^*$ color space, which was standardized in 1976 by the Commission Internationale de l'Eclairage, and also adopted in JIS Z 8781-4(2013). The value of $L^*$ represents lightness. The value of $C^*$ represents chroma, which is a distance from the starting point. The value of h represents the hue angle that starts at 0° from the axis in the $a^*$ red direction, and moves counterclockwise in terms of hue in the $L^*a^*b^*$ color space.

A lightness $L^*(45°)$ of less than 20 of the first colored coating film leads to the formation of a multilayer coating film excellent in blackness.

From the standpoint of blackness of the formed multilayer coating film, the first colored coating film has a lightness $L^*(45°)$ of preferably 10 or less, and more preferably 4 or less.

As used herein, "lightness $L^*$ (45°)" refers to a lightness $L^*$ as measured for light received at an angle of 45 degrees deviated from a specular angle toward a measurement light when the measurement light is illuminated on the surface of the object to be measured at an angle of 45 degrees with respect to the axis perpendicular to the surface of the object to be measured, and is defined as a value of lightness computed from a spectral reflectance using a multi-angle spectrophotometer (trade name: MA-68II; produced by X-Rite).

The first colored paint (X) preferably further contains a resin component and a medium containing water and/or an organic solvent, in addition to carbon black.

The resin component typically contains a base resin and a curing agent, and the resin component for use may be known resins or compounds commonly used in the art. Examples of base resins include acrylic resins, polyester resins, epoxy resins, and polyurethane resins. Examples of curing agents include amino resins, polyisocyanate compounds, and blocked polyisocyanate compounds.

The first colored paint (X) may be an aqueous paint or a solvent-based paint. However, from the standpoint of reducing environmental burden, the first colored paint (X) is preferably an aqueous paint. When the first colored paint (X) is an aqueous paint, the base resin is a resin containing a hydrophilic group, such as a carboxyl group, a hydroxyl group, a methylol group, an amino group, a sulfonic acid group, or a polyoxyethylene group, most preferably a carboxyl group, in an amount sufficient for making the resin soluble in water or dispersed in water. The base resin can be made soluble in water or dispersed in water by neutralizing the hydrophilic group.

The first colored paint (X) may further optionally contain a color pigment other than the carbon black pigment, an extender pigment, an effect pigment, a UV absorber, a light stabilizer, an antifoaming agent, a thickening agent, and a surface adjusting agent.

Examples of color pigments other than the carbon black pigment include titanium oxide, zinc oxide, molybdenum red, Prussian blue, cobalt blue, azo pigments, phthalocyanine pigments, quinacridone pigments, isoindoline pigments, threne pigments, perylene pigments, dioxazine pigments, and diketopyrrolopyrrole pigments. These color pigments can be used singly, or in a combination of two or more.

Examples of extender pigments include clay, kaolin, barium sulfate, barium carbonate, calcium carbonate, talc, silica, and alumina white. Of these, barium sulfate and/or talc is preferable for use.

When the first colored paint (X) contains the extender pigment described above, the content of the extender pigment is preferably 30 parts by mass or less, and more preferably 0.1 to parts by mass, per 100 parts by mass of the resin solids in the first colored paint (X).

Examples of effect pigments include aluminum (including vapor-deposition aluminum), copper, zinc, brass, nickel, glass flakes, aluminum oxide, mica, aluminum oxide coated with titanium oxide and/or iron oxide, and mica coated with titanium oxide and/or iron oxide.

When the first colored paint (X) contains the effect pigment described above, the content of the effect pigment is preferably 30 parts by mass or less, and more preferably 0.1 to parts by mass, per 100 parts by mass of the resin solids in the first colored paint (X).

The first colored paint (X) can be applied by a typical method. Examples include methods such as air spray coating, airless spray coating, and rotary-atomization coating. When applying a colored base paint, electrostatic charge may optionally be applied. Of such methods, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the first colored paint (X) be adjusted to have a solids content and a viscosity suitable for coating by adding water and/or an organic solvent, with optional additives such as a rheology control agent and an antifoaming agent.

The first colored paint (X) has a solids content of 10 to 60 mass*, preferably is to 55 mass*, and still more preferably to 50 mass %. It is also preferred that the viscosity of the first colored paint (X) be suitably adjusted with water and/or an organic solvent to a range suitable for coating, which is typically 500 to 5000 mPa·s as measured with a Brookfield viscometer at a rotational speed of 6 rpm at 20° C.

From the standpoint of, for example, obtaining a multilayer coating film excellent in undercoat hiding power and blackness, the first colored coating film has a thickness of preferably about 5 to 40 µm, more preferably 5 to 35 µm, and still more preferably about 5 to 25 µm, on a cured film basis.

Step (2)

The method for forming a multilayer coating film according to the present invention subsequently applies a second colored paint (Y) to the first colored coating film formed in step (1) to form a second colored coating film in step (2). The second colored paint (Y) provides a pearlescent design and increases the reflectance of infrared lasers, while maintaining the blackness of the formed multilayer coating film. The second colored paint (Y) contains a pigment (A) that is a transparent or translucent base material coated with a metal oxide. In the present specification, "transparent base material" refers to a base material that transmits at least 90% of visible light, and "translucent base material" refers to a base material that transmits light at least 10% and less than 90% of visible light.

The pigment (A) that is a transparent or translucent base material coated with a metal oxide may be, for example, a pigment prepared by coating the surface of a transparent or translucent flaky base material, such as natural mica, synthetic mica, glass, silica, or a metal oxide (e.g., iron oxide and aluminum oxide) with a metal oxide that has a refractive index different from that of the base material. The pigment for use may be a single pigment, or a combination of two or more pigments.

The metal oxide includes titanium oxide and iron oxide. Various different interference colors can be expressed by varying the thickness of the metal oxide.

The pigment that is a transparent or translucent base material coated with a metal oxide specifically includes the following metal-oxide-coated mica pigment (A1), metal-oxide-coated glass flake pigment (A2), metal-oxide-coated alumina flake pigment, and metal-oxide-coated silica flake pigment.

The metal-oxide-coated mica pigment (A1) is obtained by coating the surface of natural mica or synthetic mica as a base material with a metal oxide.

Natural mica is a flaky base material obtained by pulverizing mica from ore. Synthetic mica is synthesized by heating an industrial material, such as $SiO_2$, MgO, $Al_2O$, $K_2SiF_6$, or $Na_2SiF_6$, to melt the material at a high temperature of about 1500° C.; and by cooling the melt for crystallization. When compared with natural mica, synthetic mica contains a smaller amount of impurities, and has a more uniform size and thickness. Specific examples of synthetic mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$)), and LiNa taeniolite ($LiMg_2LiSi_4O_{10}F_2$).

The metal-oxide-coated glass flake pigment (A2) is obtained by coating the surface of flake glass as a base material with a metal oxide. Due to the smooth surface of the base material, the metal-oxide-coated glass flake pigment (A2) causes strong light reflection.

The metal-oxide-coated alumina flake pigments are obtained by coating the surface of alumina flakes as a base material with a metal oxide. Alumina flakes refer to a flaky (thin) aluminum oxide, which is transparent and colorless. Alumina flakes do not necessarily consist of only aluminum oxide, and may contain other metal oxides.

The metal-oxide-coated silica flake pigments are obtained by coating flake silica, which is a base material with a smooth surface and a uniform thickness, with a metal oxide.

From the standpoint of providing a pearlescent design and increasing the reflectance of infrared lasers, while maintaining the blackness of the formed multilayer coating film, the content of the pigment (A) that is a transparent or translucent base material coated with a metal oxide is, on a solids basis, preferably 5 to 30 parts by mass, and more preferably 7 to 25 parts by mass, per 100 parts by mass of the resin solids of the second colored paint (Y).

Of the above-described pigment (A) that is a transparent or translucent base material coated with a metal oxide, the metal-oxide-coated mica pigment (A1) and/or the metal-oxide-coated glass flake pigment (A2) are preferable from the standpoint of providing a pearlescent design and increasing the reflectance of infrared lasers, while maintaining the blackness of the formed multilayer coating film.

From the standpoint of providing a pearlescent design and increasing the reflectance of infrared lasers, while maintaining the blackness of the formed multilayer coating film, the metal-oxide-coated mica pigment (A1) has a hue angle h (15°) preferably within the range of either 240° to 360° or 0° to 100°, more preferably either 300° to 360° or 0° to 60°, and still more preferably either 330° to 360 or 0° to 30° in the L*C*h color space.

The hue angle h (15°) in the L*C*h color space is defined as a value of hue angle h determined in the following manner. A paint containing the pigment (A) that is a transparent or translucent base material coated with a metal oxide as a coloring material in its formulation is applied to the black portion of the hiding power test specimen described in JIS K5600-4-1 to obtain a coating film. The hue angle is then measured for measurement light that illuminates the coating film at an angle of 45° with respect to the axis perpendicular to the film, and that is received at an angle of 15° deviated toward the measurement light from the specular angle. The hue angle is measured with a multi-angle spectrophotometer (MA-68II, trade name, produced by X-Rite Inc.), and calculated based on spectral reflectance.

Specifically, the hue angle can be determined as follows. First, a nitrocellulose-based clear paint (ACRIC 2026GL, produced by Kansai Paint Co., Ltd.) and 10 parts by mass of a single pigment (A) that is a transparent or translucent base material coated with a metal oxide per 100 parts by mass of the resin solids of the nitrocellulose-based clear paint are mixed with stirring. A solvent is then added to dilute the mixture to a solids content of about 32%. Subsequently, the obtained paint is applied to the black portion of the hiding power test specimen described in JIS K5600-4-1 fixed horizontally on a flat glass plate with a doctor blade such that the coating film has a thickness of 15 µm on a cured coating film basis. After being allowed to stand at room temperature for 1 minute, the coating film is dried by heating at 50° C. for 1 minute with a hot-air dryer, and the obtained coating film is measured with a multi-angle spectrophotometer (MA-68II, trade name, produced by X-Rite Inc.).

The metal-oxide-coated mica pigment (A1) that has a hue angle h (15°) within the range of either 240° to 360° or 0° to 100° in the L*C*h color space for use may be a commercially available product.

Examples of commercially available products include Lumina Royal Exterior Aqua 7803H, Lumina Exterior Aqua Blue 7303D, Mearlin Exterior CFS Super Blue 6303Z, Lumina Exterior Red Blue 6303D, Mearlin Exterior CFS Fine Blue 6303V, Mearlin Exterior CFS Micro Blue 6303M, Lumina Royal Exterior Blue 6803H), Lumina Royal Exterior Indigo 5803H, Mearlin Exterior CFS Super Violet 5303Z, Mearlin Exterior CFS Fine Violet 5303V, Lumina Royal Exterior Magenta 4803H, Mearlin Exterior CFS Blue Russet 6503Z, Lumina Exterior Red 4303D, Mearlin Exterior CFS Super Red 4303Z, Mearlin Exterior CFS Fine Red 4303V, Lumina Exterior Russet 4503D, Mearlin Exterior CFS Micro Russet 4503M, Mearlin Exterior CFS Super Russet 4503Z, Mearlin Exterior CFS Fine Russet 4503V, Mearlin Exterior CFS Super Copper 3503Z, Lumina Exterior Copper 3503D, Mearlin Exterior CFS Micro Copper 3503M, Mearlin Exterior CFS Fine Copper 3503V, Lumina Royal Exterior Copper 3903H, Mearlin Exterior CFS Super Orange 3303Z, Mearlin Exterior CFS Fine Orange 3303V, Mearlin Exterior CFS Micro Bronze 2503M, Mearlin Exterior CFS Fine Bronze 2503V, Mearlin Exterior CFS Super Bronze 2503Z, Mearlin Exterior CFS Super Bright Orange 3333Z, Lumina Exterior Brass 2323D, Mearlin Exterior CFS Fine Brass 2323V, Mearlin Exterior CFS Super Brass 2323Z, Lumina Exterior Gold 2303D, Mearlin Exterior CFS Micro Gold 2303M, Mearlin Exterior CFS Super Gold 2303Z, Mearlin Exterior CFS Fine Gold 2303V, Lumina Royal Exterior Dragon Gold S2823D (all above produced by BASF). KC98225-SW Exterior Dazzling Peacock Blue, KC98219-SW Exterior Dazzling Amethyst, KC98215-SW Exterior Dazzling Goldfish, KC98204-SW Exterior Violet Cuckoo, KC98202-SW Exterior Red Kylin, KC98205-SW Exterior Dazzling Granary (all of the above produced by KUNCAI), Iriodin 225 WNT, Iriodin 221 WNT, Iriodin Ultra 7225 WNT, Pyrisma T40-23 SW Color Space Blue, Pyrisma T81-23 SW Liquid Blue, Pyrisma T40-27 SW Color Space Indigo, Iriodin Ultra 7219 WNT, Iriodin 223 WNT, Iriotec 9875, Iriodin 219 WNT, Iriotec 9870, Iriodin 211 NT, Iriodin Ultra 7215 WNT, Iriodin 215 WNT, Iriodin 505 WNT, Iriodin 525 WNT, Iriodin 504 WNT, Iriodin 524 WNT, Iriodin 217 WNT, Iriodin 502 WNT, Iriodin Ultra 7217 SW, Iriodin 508 WNT, Pyrisma T40-20 SW Color Space Yellow, Iriodin 303 WNT, Iriodin 323 WNT, Iriodin 205 WNT, Iriodin Ultra 7205 WNT, Iriotec 9880 (all of the above produced by Merck), Twinclepearl BXC-SO, Twinclepearl BC-100SO, Twinclepearl VXC-SO, Twinclepearl RBC-100SO, Twinclepearl RXC-SO, Twinclepearl RC-100SO, Twinclepearl YC-100SO, Twinclepearl YXC-SO, and Twinclepearl RYXC-SO (all of the above produced by Nihon Koken Kogyo Co., Ltd.).

Of these, examples of the metal-oxide-coated mica pigment (A1) having a hue angle h (15°) within the range of either 300° to 360° or 0° to 60° in the L*C*h color space include Lumina Royal Exterior Indigo 5803H, Mearlin Exterior CFS Super Violet 5303Z, Mearlin Exterior CFS Fine Violet 5303V, Lumina Royal Exterior Magenta 4803H, Mearlin Exterior CFS Blue Russet 6503Z, Lumina Exterior Red 4303D, Mearlin Exterior CFS Super Red 4303Z, Mearlin Exterior CFS Fine Red 4303V, Lumina Exterior Russet 4503D, Mearlin Exterior CFS Micro Russet 4503M, Mearlin Exterior CFS Super Russet 4503Z, Mearlin Exterior CFS Fine Russet 4503V, Mearlin Exterior CFS Super Copper 3503Z, Lumina Exterior Copper 3503D, Mearlin Exterior CFS Micro Copper 3503M, Mearlin Exterior CFS Fine Copper 3503V, Lumina Royal Exterior Copper 3903H (all of the above produced by BASF), KC98219-SW Exterior Dazzling Amethyst, KC98215-SW Exterior Dazzling Goldfish, KC98204-SW Exterior Violebt Cuckoo, KC98202-SW Exterior Red Kylin (all of the above produced by KUNCAI), Pyrisma T40-27 SW Color Space Indigo, Iriodin Ultra 7219 WNT, Iriodin 223 WNT, Iriotec 9875, Iriodin 219 WNT, Iriotec 9870, Iriodin 211 WNT, Iriodin Ultra 7215 WNT, Iriodin 215 WNT, Iriodin 505 WNT, Iriodin 525 WNT, Iriodin 504 WNT, Iriodin 524 WNT, Iriodin 217 WNT, Iriodin 502 WNT, Iriodin Ultra 7217 SW, Iriodin 508 WNT (all of the above produced by Merck), Twinclepearl VXC-SO, Twinclepearl RBC-100SO, Twinclepearl RXC-SO, and Twinclepearl RC-100SO (all of the above produced by Nihon Koken Kogyo Co., Ltd.).

Of these, examples of the metal-oxide-coated mica pigment (A1) having a hue angle h (15°) within the range of either 330° to 360° or 0° to 30° in the L*C*h color space include Mearlin Exterior CFS Blue Russet 6503Z, Lumina Exterior Red 4303D, Mearlin Exterior CFS Super Red 4303Z, Mearlin Exterior CFS Fine Red 4303V, Lumina Exterior Russet 4503D, Mearlin Exterior CFS Micro Russet 4503M, Mearlin Exterior CFS Super Russet 4503Z, Mearlin Exterior CFS Fine Russet 4503V (all of the above produced by BASF), KC98215-SW Exterior Dazzling Goldfish, KC98204-SW Exterior Violet Cuckoo (all of the above produced by KUNCAI), Iriotec 9870, Iriodin 211 WNT, Iriodin Ultra 7215 WNT, Iriodin 215 WNT, Iriodin 505 WNT, Iriodin 525 WNT, Iriodin 504 WNT, Iriodin 524 WNT, Iriodin 217 WNT (all of the above produced by Merck), Twinclepearl RBC-100SO, and Twinclepearl RXC-SO (all of the above produced by Nihon Koken Kogyo Co., Ltd.).

When the pigment (A) that is a transparent or translucent base material coated with a metal oxide contains the metal-oxide-coated mica pigment (A1), the content of the metal-oxide-coated mica pigment (A1) is, on a solids basis, preferably to 20 parts by mass, and more preferably 7 to 15 parts by mass, per 100 parts by mass of the resin solids of the second colored paint (Y) from the standpoint of providing a pearlescent design and increasing the reflectance of infrared lasers, while maintaining the blackness of the formed multilayer coating film.

From the standpoint of providing a pearlescent design and increasing the reflectance of infrared lasers, while maintaining the blackness of the formed multilayer coating film, the metal-oxide-coated glass flake pigment (A2) has a hue angle h (15°) within the range of preferably either 240° to 360° or 0° to 100°, more preferably either 300° to 360° or 0° to 60°, and still more preferably either 330° to 360° or 0° to 30° in the L*C*h color space.

The metal-oxide-coated glass flake pigment (A2) having a hue angle h (15°) within the range of either 240° to 360° or 0° to 100° in the L*C*h color space for use may be a commercially available product. Examples of commercially available products include LUXAN CFX C261, LUXAN CFX B261, LUXAN CFX B241, LUXAN CFX B542, LUXAN CFX B522, LUXAN CFX B502, LUXAN CFX B393 (all of the above produced by Eckart), Metashine ST1018RBJ5, Metashine ST1018RRJ5, Metashine GT1020RRJ5, Metashine ST1018TAJ5, Metashine SBE025TCJ5, Metashine GT1030TPJ5, Metashine ST1018TPJ5, Metashine SBE025TCJ5, Metashine ST1018RYJ5, and Metashine GT1030RYJ5 (all of the above produced by Nippon Sheet Glass Co., Ltd.).

Of these, examples of the metal-oxide-coated glass flake pigment (A2) having a hue angle h (15°) within the range of either 300° to 360° or 0° to 60° in the L*C*h color space include LUXAN CFX B241, LUXAN CFX B542, LUXAN CFX B522 (all of the above produced by Eckart), Metashine ST1018RRJ5, Metashine GT1020RRJ5, Metashine ST1018TAJ5, Metashine SBE025TCJ5, Metashine GT1030TPJ5, Metashine ST1018TPJ5, and Metashine SBE025TCJ5 (all of the above produced by Nippon Sheet Glass Co., Ltd.).

Of these, examples of the metal-oxide-coated glass flake pigment (A2) having a hue angle h (15°) within the range of either 330° to 360° or 0° to 30° in the L*C*h color space include LUXAN CFX B241, LUXAN CFX B542 (both produced by Eckart), Metashine ST1018RRJ5, Metashine GT1020RRJ5, Metashine ST1018TAJ5, and Metashine SBE025TCJ5 (all of the above produced by Nippon Sheet Glass Co., Ltd.).

When the pigment (A) that is a transparent or translucent base material coated with a metal oxide contains the metal-oxide-coated glass flake pigment (A2), the content of the metal-oxide-coated glass flake pigment (A2) is, on a solids basis, preferably 15 to 30 parts by mass, and more preferably 17 to 25 parts by mass, per 100 parts by mass of the resin solids of the second colored paint (Y) from the standpoint of providing a pearlescent design and increasing the reflectance of infrared lasers, while maintaining the blackness of the formed multilayer coating film.

The second colored paint (Y) preferably further contains a resin component and a medium containing water and/or an organic solvent, in addition to the pigment (A) that is a transparent or translucent base material coated with a metal oxide The resin component typically contains a base resin and a curing agent, and the resin component for use may be known resins or compounds commonly used in the art. Examples of base resins include acrylic resins, polyester resins, epoxy resins, and polyurethane resins. Examples of curing agents include amino resins, polyisocyanate compounds, and blocked polyisocyanate compounds.

The second colored paint (Y) may be an aqueous paint or a solvent-based paint. However, from the standpoint of reducing environmental burden, the second colored paint (Y) is preferably an aqueous paint. When the second colored paint (Y) is an aqueous paint, the base resin is a resin that contains a hydrophilic group, such as a carboxyl group, a hydroxyl group, a methylol group, an amino group, a sulfonic acid group, or a polyoxyethylene group, most preferably a carboxyl group, in an amount sufficient for making the resin soluble in water or dispersed in water. The base resin can be made soluble in water or dispersed in water by neutralizing the hydrophilic group.

The second colored paint (Y) may further optionally contain, for example, a color pigment, an extender pigment, an effect pigment other than the pigment (A) that is a transparent or translucent base material coated with a metal oxide, a UV absorber, a light stabilizer, an antifoaming agent, a thickening agent, and a surface adjusting agent.

Examples of color pigments include carbon black pigments (B), titanium oxide, zinc oxide, molybdenum red, Prussian blue, cobalt blue, azo pigments, phthalocyanine pigments, quinacridone pigments, isoindoline pigments, threne pigments, perylene pigments, dioxazine pigments, and diketopyrrolopyrrole pigments. These color pigments can be used singly, or in a combination of two or more.

Of these, from the standpoint of blackness of the formed multilayer coating film, the color pigment for use is preferably a carbon black pigment (B).

When the second colored paint (Y) contains the carbon black pigment (B), the content of the carbon black pigment (B) is, on a solids basis, preferably 0.1 to 2 parts by mass, and more preferably 0.3 to 1.7 parts by mass, per 100 parts by mass of the resin solids of the second colored paint (Y) from the standpoint of the blackness and reflectance of infrared lasers of the formed multilayer coating film.

When the second colored paint (Y) contains the carbon black pigment (B), the ratio of the carbon black pigment (B) to the pigment (A) that is a transparent or translucent base material coated with a metal oxide (i.e., the carbon black pigment (B)/the pigment (A) that is a transparent or translucent base material coated with a metal oxide) is, on a mass basis, preferably 0.15 or less, and more preferably 0.1 or less from the standpoint of the blackness, pearlescent design, and reflectance of infrared lasers of the formed multilayer coating film.

Examples of extender pigments include clay, kaolin, barium sulfate, barium carbonate, calcium carbonate, talc, silica, and alumina white. Of these, barium sulfate and/or talc is preferably used.

When the second colored paint (Y) contains the extender pigment as described above, the content of the extender pigment is within the range of preferably 30 parts by mass or less, and more preferably 0.1 to 20 parts by mass, per 100 parts by mass of the resin solids of the second colored paint (Y).

Examples of effect pigments other than the pigment (A) that is a transparent or translucent base material coated with a metal oxide include aluminum (including vapor-deposition aluminum), copper, zinc, brass, nickel, glass flakes, aluminum oxide, and mica.

When the second colored paint (Y) contains an effect pigment other than the pigment (A) that is a transparent or translucent base material coated with a metal oxide, the content of the effect pigment is within the range of preferably 10 parts by mass or less, and more preferably 0.1 to B parts by mass, per 100 parts by mass of the resin solids of the second colored paint (Y).

The second colored paint (Y) can be applied by a typical method. Examples include methods such as air spray coating, airless spray coating, and rotary-atomization coating. When applying a colored base paint, electrostatic charge may optionally be applied. Of such methods, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the second colored paint (Y) be adjusted to have a solids content and a viscosity suitable for coating by adding water and/or an organic solvent, with optional additives such as a rheology control agent and an antifoaming agent.

The second colored paint (Y) has a solids content of 10 to 60 mass %, preferably 15 to 55 mass %, and still more preferably to 50 mass %. It is also preferred that the viscosity of the second colored paint (Y) be suitably adjusted with water and/or an organic solvent to a range suitable for coating, which is typically 500 to 5000 mPa·s as measured with a Brookfield viscometer at a rotational speed of 6 rpm at 20° C.

From the standpoint of, for example, providing a pearlescent design and increasing the reflectance of infrared lasers, while maintaining blackness of the formed multilayer coating film, the second colored coating film has a thickness of preferably about 3 to 40 μm, more preferably 4 to 30 μm, and still more preferably about 5 to 20 μm on a cured film basis.

Step (3)

The method for forming a multilayer coating film according to the present invention applies a clear paint (Z) to the second colored coating film obtained by applying the second colored paint (Y) as described above to form a clear coating film in step (3).

The clear paint (Z) for use in the method according to the present invention may be any known clear paint. Specific examples include liquid or powdery clear paints that contain a resin component composed of a base resin and a cross-linking agent as an essential component, and optional components such as additives for paints and a solvent (e.g., water or an organic solvent); and that form a colorless or colored transparent coating film.

Examples of base resins include resins that have cross-linkable functional groups (e.g., hydroxyl, carboxyl, silanol, and epoxy), such as acrylic resin, polyester resin, alkyd resin, fluorine resin, urethane resin, and silicon-containing resin. Examples of crosslinking agents include compounds or resins that have a functional group reactive with the functional groups of the base resin, such as melamine resin, urea resin, polyisocyanate compounds, block polyisocyanate compounds, epoxy compounds or resins, carboxy-containing compounds or resins, acid anhydrides, and alkoxy silyl group-containing compounds or resins.

The proportion of the base resin and the crosslinking agent in the resin component is not particularly limited. Typically, the amount of the crosslinking agent for use is 10 to 100 mass %, preferably 20 to 80 mass %, and more preferably 30 to 60 mass % based on the total solids of the base resin.

The clear paint (Z) may optionally contain a solvent such as water and an organic solvent; and additives for paints such as a curing catalyst, an antifoaming agent, a UV absorber, a rheology control agent, and an anti-settling agent.

The clear paint (Z) may also contain a color pigment to the extent that the transparency of the coating film is not impaired. The color pigment for use can be a known pigment for ink or paint, and these pigments can be used singly or in a combination of two or more. Although the amount of the color pigment for use varies, for example, depending on the type of color pigment for use, the amount of the color pigment is typically 30 mass % or less, preferably 0.05 to 20 mass %, and more preferably 0.1 to 10 mass % based on the total solids of the resin component in the clear paint.

The clear paint (Z) can be applied by a method such as electrostatic coating, air spray coating, and airless spray coating. The clear coating film has a thickness of preferably about 10 to 60 μm, more preferably 15 to 50 μm, and still more preferably about 20 to 40 μm on a cured coating film basis.

The clear paint (Z) has a solids content of 10 to 65 mass %, preferably 15 to 55 mass %, and still more preferably 20 to 50 mass*. It is also preferred that the viscosity of the clear paint (Z) be suitably adjusted with water and/or an organic solvent to a range suitable for coating, which is typically about to 60 seconds, and particularly about 20 to 50 seconds as measured with a Ford cup No. 4 viscometer at 20° C.

Step (4)

The method for forming a multilayer coating film according to the present invention heats the first colored coating film formed in step (1), the second colored coating film formed in step (2), and the clear coating film formed in step separately or simultaneously to cure these films in step (4).

In particular, from the standpoint of, for example, energy-saving, the first colored coating film, the second colored coating film, and the clear coating film are preferably heated simultaneously.

Heating can be performed with a known technique, such as a hot-blast furnace, an electric furnace, or an infrared-guided heating furnace. The heating temperature is preferably 70 to 150° C., and more preferably 80 to 140° C. The heating time is not particularly limited; and is preferably 10 to 40 minutes, and more preferably 20 to 30 minutes.

Base Material

The base material to which the method for forming a multilayer coating film according to the present invention is applied can be any base material. Examples include members formed of metal, such as iron, zinc, aluminum, or magnesium; members formed of alloys of these metals; members plated with these metals, or members on which these metals are deposited; and members formed of, for example, glass, plastic, or foam of various materials. In particular, steel and plastic materials that constitute vehicle bodies are suitable, with steel being particularly suitable. These members can be optionally subjected to a treatment such as degreasing or surface treatment.

These members on which an undercoating film and/or an intermediate coating film are formed may also be used as a base material. It is generally preferable to use these base materials.

The undercoating film is applied to the surface of a member to hide the surface of the member, or impart anticorrosion properties and rust-resistance to the member. The undercoating film can be formed by applying an undercoat paint, and curing it. This undercoat paint can be any undercoat paint; and may be a known paint, such as an electrodeposition paint or a solvent-based primer.

The intermediate coating film is applied to a base with an intention to hide the surface of a member or base such as the undercoating film, enhance the adhesion between the undercoating and the top coating film, or impart chipping resistance to the coating film. The intermediate coating can be formed by applying an intermediate paint to the surface of a base such as the surface of a member or undercoating film, and curing the paint. The intermediate paint for use can be any known intermediate paint. For example, an organic solvent-based or aqueous intermediate paint containing a thermosetting resin composition and a color pigment can be preferably used.

When a member having an undercoating film and/or intermediate coating film formed thereon is used as a base material in the method for forming a multilayer coating film according to the present invention, the undercoating film and/or intermediate coating film is cured by heating beforehand, and then the first colored paint (X) of step (1) can be applied. The first colored paint (X) can also be applied with the undercoating film and/or intermediate coating film being uncured.

Formation of Multilayer Coating Film

In accordance with the method for forming a multilayer coating film according to the present invention, a multilayer coating film is formed by performing step (1): applying a carbon black pigment-containing first colored paint (X) to form a first colored coating film, step (2): applying a second colored paint (Y) containing a pigment (A) that is a transparent or translucent base material coated with a metal oxide to the first colored coating film to form a second colored coating film, step (3): applying a clear paint (Z) to the second colored coating film to form a clear coating film, and step (4): heating the first colored coating film formed in step (1), the second colored coating film formed in step (2), and the clear coating film formed in step (3) separately or simultaneously to cure these films. The first colored coating film has a lightness L*(45°) of less than 20. The multilayer coating film has a lightness L*(45) of less than 20. The multilayer coating film has a diffuse reflectance of 10% or more at a wavelength of 905 nm. Accordingly, the method provides a multilayer coating film that has pearly luster with excellent blackness and high reflectance of an infrared laser.

Because the formed multilayer coating film has a lightness L*(45) of less than 20, the multilayer coating film can have excellent blackness. A first colored coating film having a lightness L*(45') of 20 or more leads to insufficient blackness of the multilayer coating film. In particular, the multilayer coating film has a lightness L*(45°) of preferably 17 or less, and more preferably 15 or less from the standpoint of excellent blackness of the multilayer coating film.

A multilayer coating film having a diffuse reflectance of 10% or more at a wavelength of 905 nm can have an excellent reflectance of infrared lasers. When the multilayer coating film has a diffuse reflectance of less than 10% at a wavelength of 905 nm, the reflection of infrared lasers returning from the multilayer coating film is weak. The wavelength at 905 nm is a wavelength suitable for measuring a distance by vehicle-mounted LIDAR.

In the present specification, "diffuse reflectance" is defined as a value of reflectance determined by measuring a reflectance containing no specular reflection (SCE: Specular Component Excluded) with a spectrophotometer equipped with an integrating sphere (Solid Spec 3700, trade name, Shimadzu Corporation), and performing calculation. The diffuse reflectance can be measured every 1 nm from the wavelength of 400 nm, and the average of measured diffuse reflectances at each wavelength is determined.

In particular, the diffuse reflectance at a wavelength of 905 nm of the multilayer coating film is preferably 11% or more, and more preferably 12% or more from the standpoint of excellent reflectance of infrared lasers of the multilayer coating film.

Additionally, the ratio of the diffuse reflectance at a wavelength of 905 nm to the average of diffuse reflectances at a wavelength of 400 to 700 nm of the multilayer coating film is preferably 1.3 or more. A greater ratio of the diffuse reflectance at a wavelength of 905 nm to the average of diffuse reflectances at a wavelength of 400 to 700 nm indicates a higher reflectance of infrared lasers while maintaining the blackness of the formed multilayer coating film. In particular, the ratio of the diffuse reflectance at a wavelength of 905 nm to the average of diffuse reflectances at a wavelength of 400 to 700 nm of the multilayer coating film is preferably 1.5 or more, and more preferably 1.7 or more from the standpoint of the blackness and reflectance of infrared lasers of the formed multilayer coating film.

Thus, the method for forming a multilayer coating film according to the present invention can be suitably used in forming a multilayer coating film on a variety of industrial products, in particular exterior panels of vehicle bodies.

The present invention also includes the following subject matter.

Item 1.

A method for forming a multilayer coating film, the method comprising step (1): applying a carbon black pigment-containing first colored paint (X) to form a first colored coating film, step (2): applying a second colored paint (Y) containing a pigment (A) that is a transparent or translucent base material coated with a metal oxide to the first colored coating film to form a second colored coating film, step (3): applying a clear paint (Z) to the second colored coating film to form a clear coating film, and step (4): heating the first colored coating film formed in step (1), the second colored coating film formed in step (2), and the clear coating film formed in step separately or simultaneously to cure these films, wherein the first colored coating film has a lightness L*(45°) of less than 20, the multilayer coating film has a lightness L*(45°) of less than 20, and the multilayer coating film has a diffuse reflectance of 10% or more at a wavelength of 905 nm.

Item 2.

The method for forming a multilayer coating film according to Item 1, wherein the pigment (A) that is a transparent or translucent base material coated with a metal oxide contains a metal-oxide-coated mica pigment (A1) and/or metal-oxide-coated glass flake pigment (A2).

Item 3.

The method for forming a multilayer coating film according to Item 2, wherein the pigment (A) that is a transparent or translucent base material coated with a metal oxide contains the metal-oxide-coated mica pigment (A1), and the metal-oxide-coated mica pigment (A1) has a hue angle h (15°) within the range of either 240° to 360° or 0° to 100° in an L*C*h color space.

Item 4.

The method for forming a multilayer coating film according to Item 2 or 3, wherein the pigment (A) that is a transparent or translucent base material coated with a metal oxide contains the metal-oxide-coated mica pigment (A1), and the content of the metal-oxide-coated mica pigment (A1) is within the range of 5 to 20 parts by mass per 100 parts by mass of the resin solids of the second colored paint (Y).

Item 5.

The method for forming a multilayer coating film according to any one of Items 2 to 4, wherein the pigment (A) that is a transparent or translucent base material coated with a metal oxide contains the metal-oxide-coated glass flake pigment (A2), and the metal-oxide-coated glass flake pigment (A2) has a hue angle h (15°) within the range of either 240° to 360° or 0° to 100° in the L*C*h color space.

Item 6.

The method for forming a multilayer coating film according to any one of Items 2 to 5, wherein the pigment (A) that is a transparent or translucent base material coated with a metal oxide contains the metal-oxide-coated glass flake pigment (A2), and the content of the metal-oxide-coated glass flake pigment (A2) is within the range of 15 to 30 parts by mass per 100 parts by mass of the resin solids of the second colored paint (Y).

Item 7.

The method for forming a multilayer coating film Item 7. according to any one of Items 1 to 6, wherein the content of the carbon black pigment in the first colored paint (X) is 1 to 30 parts by mass per 100 parts by mass of the resin solids of the first colored paint (X).

Item 8.

The method for forming a multilayer coating film according to any one of Items 1 to 7, wherein the first colored coating film has a lightness L*(45) of 10 or less.

Item 9.

The method for forming a multilayer coating film according to any one of Items 1 to 8, wherein the second colored paint (Y) further contains a carbon black pigment (B).

Item 10.

The method for forming a multilayer coating film according to Item 9, wherein the ratio of the carbon black pigment (B) to the pigment (A) that is a transparent or translucent base material coated with a metal oxide is 0.15 or less on a mass basis.

Item 11.

The method for forming a multilayer coating film according to Item 9 or 10, wherein the content of the carbon black pigment (B) in the second colored paint (Y) is, on a solids basis, 0.1 to 2 parts by mass per 100 parts by mass of the resin solids in the second colored paint (Y).

Item 12.

The method for forming a multilayer coating film according to any one of Items 1 to 11, wherein the ratio of the diffuse reflectance at a wavelength of 905 nm to the average of diffuse reflectances at a wavelength of 400 to 700 nm of the multilayer coating film is 1.3 or more.

The following describes the present invention in more detail, with reference to Examples and Comparative Examples. However, the present invention is not limited to these Examples. Note that "parts" and "%" are on a mass basis, and the film thickness is on a cured coating film basis.

EXAMPLES

[1] Preparation of Base Material

A steel plate degreased and treated with zinc phosphate (JIS G 3141, size: 400 mm×300 mm×0.8 mm) was coated with Elecron GT-10 cationic electrodeposition paint (trade name; produced by Kansai Paint Co., Ltd.; a blocked polyisocyanate compound is used as a curing agent in an epoxy-resin polyamine-based cationic resin) by electrodeposition such that the coated film had a film thickness of 20 μm on a cured coating film basis. The coated film was heated at 170° C. for 20 minutes to allow the coated film to be crosslinked and cured, thereby forming an electrodeposition coating film.

The obtained electrodeposition coating film on the steel plate was coated with WP-523H N-2 (trade name; Kansai Paint Co., Ltd.; aqueous intermediate paint; the obtained intermediate coating film had a lightness L* (45°) of 20) by using air spray such that the film thickness was 30 μm on a cured coating film basis; and allowed to stand for 3 minutes, followed by preheating at 80° C. for 3 minutes, thereby forming an uncured intermediate coating film. This plate was determined to be a base material.

[2] Preparation of Paint

Production of Hydroxy-Containing Acrylic Resin Emulsion (a)

Production Example 1

70.7 parts of deionized water and 0.52 parts of Aqualon KH-10 (trade name; produced by DKS Co., Ltd.; emulsifier, active ingredient 97%) were placed into a reaction vessel equipped with a thermometer, a thermostat, a stirrer, a reflux condenser, and a dropping funnel; and mixed and stirred in a nitrogen stream, followed by heating to 80° C. Subsequently, 1% of the entire monomer emulsion described below and 5 parts of a 6% ammonium persulfate aqueous solution were introduced into the reactor vessel, and the mixture was maintained at 80° C. for 15 minutes. Thereafter, the remaining monomer emulsion was added dropwise to the reaction vessel maintained at the same temperature for 3 hours. After completion of the dropwise addition, the mixture was aged for 1 hour. Thereafter, while 40 parts of a 5% 2-(dimethylamino)ethanol aqueous solution was gradually added to the reaction vessel, the reaction product was cooled to 30° C. and discharged while being filtered through a 100-mesh nylon cloth, thereby obtaining a hydroxy-containing acrylic resin emulsion (a) with a solids concentration of 45%. The obtained hydroxy-containing acrylic resin had a hydroxy value of 43 mg KOH/g and an acid value of 12 mg KOH/g.

Monomer Emulsion: 50 parts of deionized water, 10 parts of styrene, 40 parts of methyl methacrylate, 35 parts of ethyl acrylate, 3.5 parts of n-butyl methacrylate, 10 parts of 2-hydroxy ethyl methacrylate, 1.5 parts of acrylic acid, 1.0 part of Aqualon KH-10, and 0.03 parts of ammonium persulfate were mixed with stirring, thereby obtaining a monomer emulsion.

Production of Hydroxy-Containing Polyester Resin Solution (b)

Production Example 2

174 parts of trimethylolpropane, 327 parts of neopentyl glycol, 352 parts of adipic acid, 109 parts of isophthalic acid, and 101 parts of 1,2-cyclohexanedicarboxylic anhydride were placed in a reaction vessel equipped with a thermometer, a thermostat, a stirrer, a reflux condenser, and a water separator; and the temperature was increased from 160° to 230° C. over a period of 3 hours. Thereafter, the temperature was maintained at 230° C. while the generated condensed water was distilled off with the water separator to allow the reaction to proceed until the acid value reached 3 mg KOH/g or less. 59 parts of trimellitic anhydride was added to this reaction product, and addition reaction was performed at 170° C. for 30 minutes, followed by cooling to 50° C. or less. 2-(dimethylamino)ethanol in an equivalent amount to acid groups was added thereto to neutralize the reaction product; and then deionized water was gradually added, thereby obtaining a hydroxy-containing polyester resin solution (b) with a solids concentration of 45%. The obtained hydroxy-containing polyester resin had a hydroxy value of 128 mg KOH/g, an acid value of 35 mg KOH/g, and a weight average molecular weight of 13,000.

Production of Pigment Dispersion Pastes (P-1) to (P-3)

Production Example 3

56 parts (solids: 25 parts) of the hydroxy-containing polyester resin solution (b) obtained in Production Example 2, 4 parts of Raven 5000 Ultra III Beads (a carbon black pigment, trade name, produced by Columbian Carbon Co.) and 5 parts of deionized water were mixed, and the mixture was adjusted to a pH of 8.0 with 2-(dimethylamino)ethanol. Subsequently, the obtained mixture was placed in a wide-mouth glass bottle, and glass beads (diameter: about 1.3 mm) as dispersion media were added thereto. The bottle was hermetically sealed, and dispersing was performed with a paint shaker for 30 minutes, thereby obtaining a pigment dispersion paste (P-1).

Production Examples 4 and 5

The procedure of Production Example 3 was repeated except that the formulations of the color pigment shown in Table 1 were applied, thereby obtaining pigment dispersion pastes (P-2) and (P-3). The formulations of the color pigments shown in Table 1 are indicated on a solids mass basis.

TABLE 1

| | | Production Examples | | |
|---|---|---|---|---|
| | | 3 | 4 | 5 |
| Pigment Dispersion Paste | | P-1 | P-2 | P-3 |
| Color Pigment | R5000 (Note 1) | 4 | 1 | 3 |
| | R6438 (Note 2) | | 10 | |
| | JR 903 (Note 3) | | | 15 |

R5000 (Note 1): A carbon black pigment, trade name: Raven 5000 Ultra III Beads, produced by Columbian Carbon Co.

R6438 (Note 2): A perylene red pigment, trade name: Maroon 179 229-6438, produced by Sun Chemical Company Ltd.

JR903 (Note 3): An inorganic titanium white pigment, trade name: TITANIX JR903, produced by Tayca Corporation.

Production of First Colored Paints (X-1) to (X-3)

Production Example 6

65 parts of the pigment dispersion paste (P-1) obtained in Production Example 3, 44.4 parts (solids: 20 parts) of the hydroxy-containing acrylic resin emulsion (a) obtained in Production Example 1, 71.4 parts (solids: 25 parts) of UCOAT UX-8100 (trade name, a urethane emulsion, produced by Sanyo Chemical Industries, Ltd., solids: 35%), and 37.5 parts (solids: 30 parts) of Cymel 325 (trade name, a melamine resin, produced by Cytec Industries Japan LLC, solids: 80%) were homogeneously mixed. Subsequently, UH-752 (trade name, produced by ADEKA Corporation, a thickening agent), 2-(dimethylamino)ethanol, and deionized water were added to the obtained mixture, thereby obtaining a first colored paint (X-1) with a pH of 8.0, a paint solids content of 25%, and a viscosity of 3000 mPa·s as measured with a Brookfield viscometer at 20° C. at a rotational speed of 6 rpm.

Production Examples 7 and 8

The procedure of Production Example 6 was repeated except that the formulations shown in Table 2 were applied, thereby obtaining first colored paints (X-2) and (X-3) with a viscosity of 3000 mPa·s as measured with a Brookfield viscometer at 20° C. at a rotational speed of 6 rpm.

Evaluation of First Colored Coating Film

The lightness $L*(45°)$ of the first colored coating films formed from the obtained first colored paints (X-1) to (X-3) was evaluated with an MA-68II (trade name; produced by X-Rite). The first colored coating films were obtained by applying each of the first colored paints (X-1) to (X-3) to the base material obtained in section [1] above such that the film thickness was 8 μm on a cured-coating-film basis by using a rotary electrostatic mini bell coater at a booth temperature of 23° C. and a humidity of 68%, allowing the film to stand at room temperature for 3 minutes, and then heating the film at 140° C. for 30 minutes in a hot-air circulating oven. Table 2 also illustrates the evaluation results.

TABLE 2

| | | Production Examples | | |
|---|---|---|---|---|
| | | 6 | 7 | 8 |
| First Colored Paint | | X-1 | X-2 | X-3 |
| Pigment Dispersion Paste | Name | P-1 | P-2 | P-3 |
| | Amount | 65 | 72 | 79 |
| First Colored Coating Film | Lightness $L*(45°)$ | 1 | 8 | 16 |

Production of Hydroxy-Containing Acrylic Resin Emulsion (c)

Production Example 9

130 parts of deionized water and 0.52 parts of Aqualon KH-10 were placed in a reaction vessel equipped with a thermometer, a thermostat, a stirrer, a reflux condenser, and a dropping funnel; and stirred and mixed in a nitrogen airstream, followed by heating to 80° C. Subsequently, 1% of the entire amount of the following monomer emulsion (1) and 5.3 parts of a 6% ammonium persulfate aqueous solution were placed in the reaction vessel and maintained at 80° C. for 15 minutes. Thereafter, the remaining monomer emulsion (1) was added dropwise into the reaction vessel maintained at the same temperature over a period of 3 hours. After completion of the dropwise addition, the mixture was aged for 1 hour. Subsequently, the following monomer emulsion (2) was added dropwise over a period of 1 hour, followed by aging for 1 hour. Thereafter, while 40 parts of a 5% dimethylethanol amine aqueous solution was gradually added to the reaction vessel, the reaction product was cooled to 30° C. and discharged while being filtered through a 100-mesh nylon cloth, thereby obtaining a hydroxy-containing acrylic resin emulsion (c) having a solids concentration of 30%. The obtained hydroxy-containing acrylic resin had a hydroxy value of 25 mg KOH/g and an acid value of 33 mg KH/g.

Monomer emulsion (1): 42 parts of deionized water, 0.72 parts of Aqualon KH-10, 2.1 parts of methylenebisacrylamide, 2.8 parts of styrene, 16.1 parts of methyl methacrylate, 28 parts of ethyl acrylate, and 21 parts of n-butyl acrylate were mixed with stirring, thereby obtaining monomer emulsion (1).

Monomer emulsion (2): 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed with stirring, thereby obtaining monomer emulsion (2).

Production of Hydroxy-Containing Polyester Resin Solution (d)

Production Example 10

109 parts of trimethylol propane, 141 parts of 1,6-hexanediol, 126 parts of hexahydrophthalic anhydride, and 120 parts of adipic acid were placed in a reaction vessel equipped with a thermometer, a thermostat, a stirrer, a reflux condenser, and a water separator; and heated to increase the temperature from 160° C. to 230° C. over a time period of 3 hours, followed by a condensation reaction at 230° C. for 4 hours. Subsequently, in order to add carboxyl groups to the obtained condensation reaction product, 38.3 parts of trimellitic anhydride was further added, and the mixture was allowed to react at 170° C. for 30 minutes. The reaction product was then diluted with 2-ethyl-1-hexanol, thereby obtaining a hydroxy-containing polyester resin solution (d) with a solids concentration of 70%. The obtained hydroxy-containing polyester resin had a hydroxy value of 150 mg KOH/g, an acid value of 46 mg KOH/g, and a weight average molecular weight of 6,400.

Production of Phosphate Group-Containing Resin Solution (e)

Production Example 11

A combined solvent containing 27.5 parts of methoxy propanol and 27.5 parts of isobutanol was placed in a reaction vessel equipped with a thermometer, a thermostat, a stirrer, a reflux condenser, and a dropping funnel; and heated to 110° C. 121.5 parts of a mixture containing 25 parts of styrene, 27.5 parts of n-butyl methacrylate, 20 parts of isostearyl acrylate (trade name, produced by Osaka Organic Chemical Industry Ltd., branched, higher alkyl acrylate), 7.5 parts of 4-hydroxybutyl acrylate, 15 parts of the following phosphate group-containing polymerizable monomer, 12.5 parts of 2-methacryloyloxyethyl acid phosphate, 10 parts of isobutanol, and 4 parts of t-butylperoxy octanoate was added to the combined solvent over a time period of 4 hours. A mixture containing 0.5 parts of t-butylperoxy octanoate and 20 parts of isopropanol was further added dropwise thereto for 1 hour, followed by aging with stirring for 1 hour, thereby obtaining a phosphate group-containing resin solution (e) with a solids concentration of 50%. This resin had an acid value due to the phosphate groups of 83 mg KOH/g, a hydroxy value of 29 mg KOH/g, and a weight average molecular weight of 10,000.

Phosphate Group-Containing Polymerizable Monomer: 57.5 parts of monobutyl phosphate and 41 parts of isobutanol were placed in a reaction vessel equipped with a thermometer, a thermostat, a stirrer, a reflux condenser, and a dropping funnel; and heated to 90° C. 42.5 parts of glycidyl methacrylate was then added dropwise over a period of 2 hours, followed by aging with stirring for 1 hour. Thereafter, 59 parts of isopropanol was added, thereby obtaining a phosphate group-containing polymerizable monomer solution with a solids concentration of 50%. The obtained monomer had an acid value due to the phosphate groups of 285 mg KOH/g.

Production of Pigment Dispersion Pastes (P-4) to (P-8)

Production Example 12

35.7 parts (solids content: 25 parts) of the hydroxy-containing polyester resin solution (d) obtained in Production Example 10, 8 parts of Maroon 179 229-6438 (trade name, a perylene red pigment, produced by Sun Chemical Company Ltd.), and parts of deionized water were mixed and adjusted to a pH of 8.0 with 2-(dimethylamino) ethanol. Subsequently, the obtained mixture was placed in a wide-mouth glass bottle, and glass beads (diameter: about 1.3 mm) were added as dispersion media. The bottle was hermetically sealed, and the mixture was dispersed with a paint shaker for 30 minutes, thereby obtaining a pigment dispersion paste (P-4).

Production Examples 13 to 16

The procedure of Production Example 12 was repeated except that the formulations of the color pigment shown in Table 3 were applied, thereby obtaining pigment dispersion pastes (P-5) to (P-8). The formulations of the color pigments shown in Table 3 are indicated on a solids mass basis.

TABLE 3

|  |  | Production Examples | | | | |
|---|---|---|---|---|---|---|
|  |  | 12 | 13 | 14 | 15 | 16 |
| Pigment Dispersion Paste | | P-4 | P-5 | P-6 | P-7 | P-8 |
| Color | R5000 (Note 1) |  | 0.5 | 1.5 | 2.5 | 3 |
| Pigment | R6438 (Note 2) | 8 |  |  |  |  |

Production of Effect Pigment Dispersions (R-1) to (R-12)

Production Example 17 parts of Iriodin 215 WNT (trade name, a titanium oxide-coated natural mica pigment, produced by Merck), 10 parts of 2-ethyl-1-hexanol, 6 parts (solids: 3 parts) of the phosphate group-containing resin solution (e), and 0.1 parts of 2-(dimethylamino) ethanol were homogeneously mixed in a stirring-mixing vessel, thereby obtaining an effect pigment dispersion (R-1).

Production Examples 18 to 28

The procedure of Production Example 17 was repeated except that the formulations of the effect pigment shown in Table 4 were applied, thereby obtaining effect pigment dispersions (R-2) to (R-12). The formulations of the effect pigments shown in Table 4 are indicated on a solids mass basis.

TABLE 4

|  |  | Production Examples | | | | | | | | | | | |
|---|---|---|---|---|---|---|---|---|---|---|---|---|---|
|  |  | 17 | 18 | 19 | 20 | 21 | 22 | 23 | 24 | 25 | 26 | 27 | 28 |
| Effect Pigment Dispersion | | R-1 | R-2 | R-3 | R-4 | R-5 | R-6 | R-7 | R-8 | R-9 | R-10 | R-11 | R-12 |
| Effect | Iriodin 215 WNT | 10 | 7 |  |  |  |  | 3 |  |  |  |  |  |
| Pigment | Twinclepearl RXC-SO (Note 4) |  |  | 10 |  |  |  |  |  | 10 |  |  |  |
|  | Iriodin 103 WNT (Note 5) |  |  |  |  |  |  |  |  | 10 |  |  |  |
|  | Iriotec 9870 (Note 6) |  |  |  | 15 |  |  |  |  |  |  |  |  |
|  | Xirallic T60-21 WNT (Note 7) |  | 3 |  |  |  |  |  |  |  | 10 | 20 |  |

TABLE 4-continued

|  | Production Examples | | | | | | | | | | | |
|---|---|---|---|---|---|---|---|---|---|---|---|---|
|  | 17 | 18 | 19 | 20 | 21 | 22 | 23 | 24 | 25 | 26 | 27 | 28 |
| Metashine ST1018RRJ1 (Note 8) |  |  |  |  | 20 |  |  |  |  |  |  |  |
| Iriodin 504 WNT (Note 9) |  |  |  |  |  | 10 |  |  |  |  |  |  |
| Xirallic F60-51 WNT (Note 10) |  |  |  |  |  |  |  |  |  |  | 10 |  |
| GX-40A (Note 11) |  |  |  |  |  |  |  |  |  |  |  | 10 |

Twinclepearl RXC-SO (Note 4): A titanium-oxide-coated synthetic mica pigment, trade name, produced by Nihon Koken Kogyo Co. Ltd.

Iriodin 103 WNT (Note 5): A titanium-oxide-coated natural mica pigment, trade name, produced by Merck Iriotec 9870 (Note 6): A titanium-oxide-coated natural mica pigment, trade name, produced by Merck Xirallic T60-21 WNT (Note 7): A titanium-oxide-coated alumina flake pigment, trade name, produced by Merck Metashine ST1018RRJ1 (Note 8): A titanium-oxide-coated glass flake pigment, trade name, produced by Nippon Sheet Glass Co., Ltd.

Iriodin 504 WNT (Note 9): An iron-oxide-coated natural mica pigment, trade name, produced by Merck Xirallic F60-51 WNT (Note 10): An iron-oxide-coated alumina flake pigment, trade name, produced by Merck GX-40A (Note 11): An aluminum pigment paste, trade name, produced by Asahi Kasei Metals Corporation.

Evaluation of Pigment that is Transparent or Translucent Base Material Coated with Metal Oxide The hue angle h (15°) in the L*C*h color space of the above-used pigments that are a transparent or translucent base material coated with a metal oxide was evaluated by the following method.

Hue Angle h (15°) in L*C*h Color Space parts by mass of a pigment to be measured was mixed with Acric 2026GL (a nitrocellulose-based clear paint, produced by Kansai Paint Co., Ltd.), per 100 parts by mass of the resin solids of Acric 2026GL, and mixed with stirring. Acric 2000GL thinner (standard version, produced by Kansai Paint Co., Ltd.) was added to dilute the mixture to a solids content of about 32%. Subsequently, the obtained paint was applied to the black portion of the hiding power test specimen described in JIS K5600-4-1 fixed horizontally on a flat glass plate with a doctor blade such that the coating film has a thickness of 15 μm on a cured coating film basis; and allowed to stand at room temperature for 1 minute. Subsequently, the coating film was dried by heating at 50° C. for 1 minute with a hot-air dryer, and the obtained coating film was evaluated with a multi-angle spectrophotometer (MA-68II, trade name, produced by X-Rite Inc.). Table 5 illustrates the evaluation results.

TABLE 5

|  |  | Hue Angle h (15°) |
|---|---|---|
| Effect Pigment | Iriodin 215 WNT | 352 |
|  | Twinclepearl RXC-SO (Note 4) | 11 |
|  | Iriodin 103 WNT (Note 5) | 243 |
|  | Iriotec 9870 (Note 6) | 333 |
|  | Xirallic T60-21 WNT (Note 7) | 6 |
|  | Metashine ST1018RRJ1 (Note 8) | 351 |
|  | Iriodin 504 WNT (Note 9) | 23 |
|  | Xirallic F60-51 WNT (Note 10) | 27 |
|  | GX-40A (Note 11) | — |

Production of Second Colored Paints (Y-1) to (Y-16)

Production Example 29

26.1 parts of the effect pigment dispersion (R-1) obtained in Production Example 17, 73.3 parts (solids content: 22 parts) of the hydroxy-containing acrylic resin emulsion (c) obtained in Production Example 9, 35.7 parts (solids content: 25 parts) of the hydroxy-containing polyester resin solution (d) obtained in Production Example 10, 57.1 parts (solids content: 20 parts) of UCOAT UX-8100 (trade name, a urethane emulsion, produced by Sanyo Chemical Industries, Ltd., solids content: 35%), and 37.5 parts (solids content: 30 parts) of Cymel 325 (trade name: a melamine resin, produced by Allnex Netherlands B.V., solids content: 80%) were homogeneously mixed. Subsequently, UH-752 (trade name, produced by Adeka Corporation, a thickening agent), 2-(dimethylamino) ethanol, and deionized water were added to the obtained mixture, thereby obtaining a second colored paint (Y-1) with a pH of 8.0, a paint solids content of 25%, and a viscosity of 3000 mPa·s as measured at 20° C. and at a rotational speed of 6 rpm with a Brookfield viscometer.

Production Example 30 to 44

Production Example 29 was repeated except that the formulations shown in Table 6 were applied, thereby obtaining first colored paints (Y-2) to (Y-16) with a viscosity of 3000 mPa·s as measured at 20° C. and at a rotational speed of 6 rpm with a Brookfield viscometer. The values in parentheses of the resin components indicate a solids content.

TABLE 6

|  |  | Production Examples | | | | | | | |
|---|---|---|---|---|---|---|---|---|---|
|  |  | 29 | 30 | 31 | 32 | 33 | 34 | 35 | 36 |
| Second Colored Paint |  | Y-1 | Y-2 | Y-3 | Y-4 | Y-5 | Y-6 | Y-7 | Y-8 |
| Effect Pigment Dispersion | Name | R-1 | R-1 | R-2 | R-3 | R-4 | R-4 | R-4 | R-5 |
|  | Amount | 26.1 | 26.1 | 26.1 | 26.1 | 31.1 | 31.1 | 31.1 | 36.1 |

TABLE 6-continued

| | | | | | | | | | | |
|---|---|---|---|---|---|---|---|---|---|---|
| Solids Content in Effect Pigment Dispersion | Phosphate Group-Containing Resin Solution (e) | | 6 (3) | 6 (3) | 6 (3) | 6 (3) | 6 (3) | 6 (3) | 6 (3) | 6 (3) |
| | Pigment (A) That is a Transparent or Translucent Base Material Coated With a Metal Oxide | Iriodin 215 WNT Twinclepearl RXC-SO (Note 4) | 10 | 10 | 7 | 10 | | | | |
| | | Iriodin 103 WNT (Note 5) | | | | | | | | |
| | | Iriotec 9870 (Note 6) | | | | | 15 | 15 | 15 | |
| | | Xirallic T60-21 WNT (Note 7) | | | 3 | | | | | |
| | | Metashine ST1018RRJ1 (Note 8) | | | | | | | | 20 |
| | | Iriodin 504 WNT (Note 9) | | | | | | | | |
| | | Xirallic F60-51 WNT (Note 10) | | | | | | | | |
| | | GX-40A (Note 11) | | | | | | | | |
| Resin Component | Hydroxy-Containing Acrylic Resin Emulsion (c) | | 73.3 (22) | 73.3 (22) | 73.3 (22) | 73.3 (22) | 73.3 (22) | 73.3 (22) | 73.3 (22) | 73.3 (22) |
| | Hydroxy-Containing Polyester Resin Solution (d) | | 35.7 (25) | | 35.7 (25) | 35.7 (25) | 35.7 (25) | | | 35.7 (25) |
| | UCOAT UX-8100 | | 57.1 (20) | 57.1 (20) | 57.1 (20) | 57.1 (20) | 57.1 (20) | 57.1 (20) | 57.1 (20) | 57.1 (20) |
| | Cymel 325 | | 37.5 (30) | 37.5 (30) | 37.5 (30) | 37.5 (30) | 37.5 (30) | 37.5 (30) | 37.5 (30) | 37.5 (30 |
| Pigment Dispersion Paste | | Name | | P-4 | | | | P-5 | P-6 | |
| | | Amount | | 48.7 | | | | 41.2 | 42.2 | |
| Solids Content in Pigment Dispersion Paste | Hydroxy-Containing Polyester Resin Solution (d) | | | 35.7 (25) | | | | 35.7 (25) | 35.7 (25) | |
| | Carbon Black Pigment (B) | R5000 (Note 1) | | | | | | 0.5 | 1.5 | |
| | | R6438 (Note 2) | | 8 | | | | | | |
| Mass Ratio: Carbon Black Pigment (B)/Pigment (A) That is a Transparent or Translucent Base Material Coated With a Metal Oxide | | | 0 | 0 | 0 | 0 | 0 | 0.033 | 0.1 | 0 |

| | | | Production Examples | | | | | | | |
|---|---|---|---|---|---|---|---|---|---|---|
| | | | 37 | 38 | 39 | 40 | 41 | 42 | 43 | 44 |
| Second Colored Paint | | | Y-9 | Y-10 | Y-11 | Y-12 | Y-13 | Y-14 | Y-15 | Y-16 |
| Effect Pigment Dispersion | | Name | R-8 | R-7 | R-8 | R-4 | R-9 | R-10 | R-11 | R-12 |
| | | Amount | 26.1 | 19.1 | 26.1 | 31.1 | 26.1 | 36.1 | 26.1 | 26.1 |
| Solids Content in Effect Pigment Dispersion | Phosphate Group-Containing Resin Solution (e) | | 6 (3) | 6 (3) | 6 (3) | 6 (3) | 6 (3) | 6 (3) | 6 (3) | 6 (3) |
| | Pigment (A) That is a Transparent or Translucent Base Material Coated With a Metal Oxide | Iriodin 215 WNT Twinclepearl RXC-SO (Note 4) | | 3 | | | | | | |
| | | Iriodin 103 WNT (Note 5) | | | | 10 | | | | |
| | | Iriotec 9870 (Note 6) | | | | | 15 | | | |
| | | Xirallic T60-21 WNT (Note 7) | | | | | | 10 | 20 | |
| | | Metashine ST1018RRJ1 (Note 8) | | | | | | | | |
| | | Iriodin 504 WNT (Note 9) | 10 | | | | | | | |
| | | Xirallic F60-51 WNT (Note 10) | | | | | | | 10 | |
| | | GX40A (Note 11) | | | | | | | | 10 |
| Resin Component | Hydroxy-Containing Acrylic Resin Emulsion (c) | | 73.3 (22) | 73.3 (22) | 73.3 (22) | 73.3 (22) | 73.3 (22) | 73.3 (22) | 73.3 (22) | 73.3 (22) |
| | Hydroxy-Containing Polyester Resin Solution (d) | | 35.7 (25) | 35.7 (25) | 35.7 (25) | | 35.7 (25) | 35.7 (25) | 35.7 (25) | |
| | UCOAT UX-8100 | | 57.1 (20) | 57.1 (20) | 57.1 (20) | 57.1 (20) | 57.1 (20) | 57.1 (20) | 57.1 (20) | 57.1 (20) |
| | Cymel 325 | | 37.5 (30) | 37.5 (30) | 37.5 (30) | 37.5 (30) | 37.5 (30) | 37.5 (30) | 37.5 (30) | 37.5 (30) |
| Pigment Dispersion Paste | | Name | | | | P-7 | | | | P-8 |
| | | Amount | | | | 43.2 | | | | 43.7 |
| Solids Content in Pigment Dispersion Paste | Hydroxy-Containing Polyester Resin Solution (d) | | | | | 35.7 (25) | | | | 35.7 (25) |
| | Carbon Black Pigment (B) | R5000 (Note 1) | | | | 2.5 | | | | 3 |
| | | R6438 (Note 2) | | | | | | | | |
| Mass Ratio: Carbon Black Pigment (B)/Pigment (A) That is a Transparent or Translucent Base Material Coated With a Metal Oxide | | | 0 | 0 | 0 | 0.167 | 0 | 0 | 0 | 0.3 |

[3] Preparation of Test Plate
Preparation of Test Plate

Examples 1 to 10 and Comparative Examples 1 to 7

Coating with First Colored Paint (X)

One of the first colored paints (X-1) to (X-3) prepared in section [2] was applied to the base material prepared in section [1] with a rotary electrostatic mini bell coater at a booth temperature of 23° C. and at a humidity of 68% such that the coating film had a thickness of 8 µm on a cured coating film basis. The coated film was then allowed to stand at room temperature for 3 minutes, thereby obtaining an uncured first colored coating film.

Coating with Second Colored Paint (Y)

One of the second colored paints (Y-1) to (Y-17) prepared in section (21 was applied to the uncured first colored coating film with a rotary electrostatic mini bell coater at a booth temperature of 23° C. and at a humidity of 68% such that the coating film had a thickness of 8 µm on a cured coating film basis. The coated film was allowed to stand at room temperature for 3 minutes, and then preheated at 80° C. for 3 minutes, thereby obtaining an uncured second colored coating film.

Coating with Clear Paint (Z)

A clear paint (Z) (Magicron KINO-1210, trade name, produced by Kansai Paint Co., Ltd., an acrylic-resin, epoxy-curable, solvent-type topcoat clear paint) was applied to each uncured second colored coating film with a rotary electrostatic mini bell coater at a booth temperature of 23° C. and at a humidity of 68% such that the coating film had a film thickness of 35 µm on a cured coating film basis. The coating film was then allowed to stand at room temperature for 7 minutes; and then heated in a hot-air circulating oven at 140° C. for 30 minutes to cure a multilayer coating film composed of the intermediate coating film, the first colored coating film, the second colored coating film, and the clear coating film by drying simultaneously, thereby preparing a test plate.

Evaluation of Coating Film

The appearance of the coating films on the test plates obtained in the above manner was evaluated by the following method. Table 7 illustrates the results.

Lightness L*(45°)

The lightness L*(45°) of the test plates was measured with an MA-68I (trade name, produced by X-Rite Inc.). The ratio of the diffuse reflectance at a wavelength of 905 nm to the average of diffuse reflectances at a wavelength of 400 to 700 nm The reflectance containing no specular reflection (SCE: Specular Component Excluded) of the test plates was measured with a Solid Spec 3700 (trade name, produced by Shimadzu Corporation); and calculation was performed, thereby determining the ratio.

TABLE 7

| | Examples | | | | | | | | | |
|---|---|---|---|---|---|---|---|---|---|---|
| | 1 | 2 | 3 | 4 | 5 | 6 | 7 | 8 | 9 | 10 |
| First Colored Paint | X-1 | X-1 | X-2 | X-1 | X-1 | X-1 | X-1 | X-3 | X-1 | X-1 |
| Second Colored Paint | Y-1 | Y-2 | Y-2 | Y-3 | Y-4 | Y-5 | Y-6 | Y-7 | Y-8 | Y-9 |
| Lightness L*(45°) | 12.8 | 8.5 | 13.5 | 11.8 | 12.5 | 14.9 | 11.1 | 18.0 | 12.1 | 12.4 |
| Diffuse Reflectance at a Wavelength of 905 nm | 11.0% | 10.8% | 13.0% | 10.5% | 11.2% | 19.0% | 14.0% | 11.0% | 10.0% | 13.0% |
| Average of Diffuse Reflectances at a Wavelength of 400 to 700 nm | 6.1% | 4.9% | 6.5% | 6.6% | 6.2% | 5.9% | 3.3% | 6.5% | 5.6% | 5.7% |
| The Ratio of the Diffuse Reflectance at a Wavelength of 905 nm to the Average of Diffuse Reflectances at a Wavelength of 400 to 700 nm | 1.8 | 2.2 | 2.0 | 1.6 | 1.8 | 3.2 | 4.3 | 1.7 | 1.8 | 2.3 |

| | Comparative Examples | | | | | | |
|---|---|---|---|---|---|---|---|
| | 1 | 2 | 3 | 4 | 5 | 6 | 7 |
| First Colored Paint | X-1 | X-1 | X-1 | X-1 | X-1 | X-1 | X-1 |
| Second Colored Paint | Y-10 | Y-11 | Y-12 | Y-13 | Y-14 | Y-15 | Y-16 |
| Lightness L* (45°) | 5.8 | 14.0 | 4.0 | 11.0 | 24.0 | 11.8 | 29.4 |
| Diffuse Reflectance at a Wavelength of 905 nm | 3.2% | 4.3% | 6.5% | 5.5% | 10.5% | 7.4% | 10.2% |
| Average of Diffuse Reflectances at a Wavelength of 400 to 700 nm | 1.9% | 6.2% | 1.3% | 5.0% | 9.5% | 6.1% | 11.3% |
| The Ratio of the Diffuse Reflectance at a Wavelength of 905 nm to the Average of Diffuse Reflectances at a Wavelength of 400 to 700 nm | 1.7 | 0.7 | 5.1 | 1.1 | 1.1 | 1.2 | 0.9 |

The invention claimed is:

1. A method for forming a multilayer coating film, the method comprising
    step (1): applying a carbon black pigment-containing first colored paint (X) to form a first colored coating film,
    step (2): applying a second colored paint (Y) containing a pigment (A) that is a transparent or translucent base material coated with a metal oxide to the first colored coating film to form a second colored coating film,
    step (3): applying a clear paint (Z) to the second colored coating film to form a clear coating film, and
    step (4): heating the first colored coating film formed in step (1), the second colored coating film formed in step (2), and the clear coating film formed in step (3) separately or simultaneously to cure these films,
    wherein the first colored coating film has a lightness) L*(45° of less than 20,
    the multilayer coating film has a lightness)L*(45° of less than 20, and
    the multilayer coating film has a diffuse reflectance of 10% or more at a wavelength of 905 nm.

2. The method for forming a multilayer coating film according to claim 1, wherein the pigment (A) that is a transparent or translucent base material coated with a metal oxide contains a metal-oxide-coated mica pigment (A1) and/or a metal-oxide-coated glass flake pigment (A2).

3. The method for forming a multilayer coating film according to claim 2, wherein the pigment (A) that is a transparent or translucent base material coated with a metal oxide contains the metal-oxide-coated mica pigment (A1), and the metal-oxide-coated mica pigment (A1) has a hue angle h(15°) within the range of either 240° to 360° or 0° to 100° in an L*C*h color space.

4. The method for forming a multilayer coating film according to claim 2, wherein the pigment (A) that is a transparent or translucent base material coated with a metal oxide contains the metal-oxide-coated mica pigment (A1), and the content of the metal-oxide-coated mica pigment (A1) is within the range of 5 to 20 parts by mass per 100 parts by mass of the resin solids of the second colored paint (Y).

5. The method for forming a multilayer coating film according to claim 3, wherein the pigment (A) that is a transparent or translucent base material coated with a metal oxide contains the metal-oxide-coated mica pigment (A1), and the content of the metal-oxide-coated mica pigment (A1) is within the range of 5 to 20 parts by mass per 100 parts by mass of the resin solids of the second colored paint (Y).

6. The method for forming a multilayer coating film according to claim 2, wherein the pigment (A) that is a transparent or translucent base material coated with a metal oxide contains the metal-oxide-coated glass flake pigment (A2), and the metal-oxide-coated glass flake pigment (A2) has a hue angle h (15°) within the range of either 240° to 360° or 0° to 100° in the L*C*h color space.

7. The method for forming a multilayer coating film according to claim 2, wherein the pigment (A) that is a transparent or translucent base material coated with a metal oxide contains the metal-oxide-coated glass flake pigment (A2), and the content of the metal-oxide-coated glass flake pigment (A2) is within the range of 15 to 30 parts by mass per 100 parts by mass of the resin solids of the second colored paint (Y).

8. The method for forming a multilayer coating film according to claim 6, wherein the pigment (A) that is a transparent or translucent base material coated with a metal oxide contains the metal-oxide-coated glass flake pigment (A2), and the content of the metal-oxide-coated glass flake pigment (A2) is within the range of 15 to 30 parts by mass per 100 parts by mass of the resin solids of the second colored paint (Y).

9. The method for forming a multilayer coating film according to claim 1, wherein the second colored paint (Y) further contains a carbon black pigment (B).

10. The method for forming a multilayer coating film according to claim 9, wherein the ratio of the carbon black pigment (B) to the pigment (A) that is a transparent or translucent base material coated with a metal oxide is 0.15 or less on a mass basis.

11. The method for forming a multilayer coating film according to claim 1, wherein the ratio of the diffuse reflectance at a wavelength of 905 nm to the average of diffuse reflectances at a wavelength of 400 to 700 nm of the multilayer coating film is 1.3 or more.

* * * * *